United States Patent
Klimov (10) Patent No.: US 11,681,617 B2
(45) Date of Patent: Jun. 20, 2023

(54) CACHE VICTIM SELECTION BASED ON COMPLETER DETERMINED COST IN A DATA PROCESSING SYSTEM

(71) Applicant: Arm Limited, Cambridge (GB)

(72) Inventor: Alexander Klimov, Hadera (IL)

(73) Assignee: Arm Limited, Cambridge (GB)

( * ) Notice: Subject to any disclaimer, the term of this patent is extended or adjusted under 35 U.S.C. 154(b) by 88 days.

(21) Appl. No.: 17/199,864

(22) Filed: Mar. 12, 2021

(65) Prior Publication Data

US 2022/0292015 A1 Sep. 15, 2022

(51) Int. Cl.
*G06F 12/0802* (2016.01)
*G06F 21/60* (2013.01)
*G06F 21/62* (2013.01)
*G06F 21/64* (2013.01)

(52) U.S. Cl.
CPC ........ *G06F 12/0802* (2013.01); *G06F 21/602* (2013.01); *G06F 21/62* (2013.01); *G06F 21/64* (2013.01); *G06F 2212/60* (2013.01)

(58) Field of Classification Search
CPC .... G06F 12/0802; G06F 21/602; G06F 21/62; G06F 21/64; G06F 2212/60; G06F 12/12; G06F 12/121; G06F 12/0815
See application file for complete search history.

(56) References Cited

U.S. PATENT DOCUMENTS

| | | | | |
|---|---|---|---|---|
| 10,318,180 B1* | 6/2019 | Benhanokh | ......... | G06F 12/0246 |
| 2012/0198175 A1* | 8/2012 | Atkisson | ............. | G06F 12/0833 |
| | | | | 711/135 |
| 2012/0246411 A1* | 9/2012 | Birka | .................... | G06F 12/121 |
| | | | | 711/E12.022 |
| 2016/0285996 A1* | 9/2016 | Akhtar | .................. | G06F 12/121 |
| 2017/0041428 A1* | 2/2017 | Katsev | .................... | H04L 67/02 |
| 2017/0115892 A1* | 4/2017 | Gokita | .................. | G06F 3/0611 |
| 2017/0177505 A1* | 6/2017 | Basak | ................. | G06F 12/1408 |
| 2018/0189186 A1* | 7/2018 | Chhabra | ............... | G06F 12/123 |
| 2018/0293175 A1* | 10/2018 | Chang | ................... | G06F 12/121 |
| 2022/0100655 A1* | 3/2022 | Seningen | ............ | G06F 12/0802 |

OTHER PUBLICATIONS

"Least Frequently Used", Wikipedia, Feb. 8, 2018 (Year: 2018).*
Chen, Di, et al. "MALRU: Miss-penalty aware LRU-based cache replacement for hybrid memory systems." Design, Automation & Test in Europe Conference & Exhibition (DATE), 2017. IEEE, 2017. (Year: 2017).*

(Continued)

*Primary Examiner* — Shin-Hon (Eric) Chen
*Assistant Examiner* — Ethan V Vo
(74) *Attorney, Agent, or Firm* — Leveque Intellectual Property Law, P.C.

(57) ABSTRACT

A data processing apparatus includes a requester, a completer and a cache. Data is transferred between the requester and the cache and between the cache and the completer. The cache implements a cache eviction policy. The completer determines an eviction cost associated with evicting the data from the cache and notifies the cache of the eviction cost. The cache eviction policy implemented by the cache is based, at least in part, on the cost of evicting the data from the cache. The eviction cost may be determined, for example, based on properties or usage of a memory system of the completer.

20 Claims, 7 Drawing Sheets

(56) References Cited

OTHER PUBLICATIONS

Salkhordeh, R., et al., 2018. An efficient hybrid I/O caching architecture using heterogeneous SSDs. IEEE Transactions on Parallel and Distributed Systems, 30(6), pp. 1238-1250. (Year: 2018).*

Kamiyama, Noriaki, et al. "Cache replacement based on distance to origin servers." IEEE Transactions on Network and Service Management 13.4 (2016): 848-859. (Year: 2016).*

Huang, Fangting, et al. "A wear-leveling-aware counter mode for data encryption in non-volatile memories." Design, Automation & Test in Europe Conference & Exhibition (DATE), 2017. IEEE, 2017. (Year: 2017).*

* cited by examiner

CACHE VICTIM SELECTION BASED ON COMPLETER DETERMINED COST IN A DATA PROCESSING SYSTEM

BACKGROUND

Data processing systems use high-speed memories, called caches, to provide faster access to data and instructions. Generally, caches are not large enough to store all of the data needed so, when new data is to be moved into the cache, the system must select which data to move out of the cache to make space for the new data. Data is moved in and out of the cache in lines. A cache line is a logical grouping of data bytes. For example, a line may be group of 64 bytes.

When a processing core requests data associated with a given memory address, the cache checks to determine if the data is in the cache. If not, an event referred to as a "cache miss" occurs and the data is read from the memory. If the cache is already full, the cache must select one of the cache lines to be removed from the cache to make space for the incoming data. The cache line selected for removal is called the "victim cache line." The act of removing the victim cache line is termed "eviction." The new data may be requested from a memory controller, for example.

The performance improvement provided by cache depends on how many times the data moved into the cache are accessed before the cache line is evicted.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

The various apparatus and devices described herein provide mechanisms for cache control in a data processing system. More particularly, the mechanisms provide an improved cache eviction mechanism using information from a completer device of the data processing system.

While this present disclosure is susceptible of embodiment in many different forms, specific embodiments are shown in the drawings and described in detail below. It is to be understood that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

Herein, an entity in a data processing system that requests and uses data from a cache is termed a "requester device" or "requester." A requester device may be a central processor unit or a processing core, for example. An entity that supplies data to the cache, in response to requests from the cache, is termed a "completer" or "completer device." A completer device may be, for example, a memory controller or home node that completes a request for data from the cache. A cache is an intermediate device between a requester and a completer. The cache may provide a temporary data store for data that has been recently or frequently used by a requester.

A data processing system may contain multiple requesters or completers. In one embodiment, these may be coupled by a network or interconnect fabric.

In the event of a cache miss when a requester device requests data associated with a given memory address, the data is provided by the completer. If the cache is already full, the cache must select one of the cache lines to be removed from the cache to make space for the incoming data. The cache line selected for removal is called the "victim cache line." The act of removing the victim cache line is termed "eviction." The new data is requested from a memory controller.

If the victim cache line contains valid data that does not match the associated data in the main memory, the content of the victim cache line is written back to the main memory and the new data is written to the victim cache line.

Cache lines are typically indexed by designated bits of the associated address in the main memory.

The cache implements a victim selection policy to select which specific cache line to replace. For a set associative cache, the victim cache line is selected from the same set as the requested data. Known victim selection policies include "round robin," where the oldest cache line is evicted, "pseudo-random" where victim cache lines are selected randomly, and "least recently used," where the cache line least recently accessed by the requester is selected for eviction.

A victim selection policy may be implemented using counters. For example, a round-robin or cyclic replacement might use a counter (the victim counter) that cycles through the available ways of the cache (the number of lines in the set for an associative cache) and cycles back to 0 when it reaches the maximum number of ways. A pseudo-random replacement strategy randomly selects the next cache line in a set to replace.

An embodiment of the disclosure includes a requester, a cache and a completer. The completer has knowledge of a cost to evict a particular cache line from the cache compared to other cache lines. The completer notifies the cache of this cost, termed the "eviction cost." As described below, this may be done when the line is read and moved into the cache or in response to a specific request from the cache. The cache uses the eviction cost, at least in part, to select which cache line to evict from the cache.

In a first embodiment, the completer is a memory protection engine (MPE). The MPE generates one-time-use numbers, called "nonces" (for number used once) to ensure memory integrity and confidentiality. The nonces are generated from a counter or list. When the counter overflows, or the list is exhausted, data in the memory must be re-encryption, which is a computational expensive task. In this embodiment, the completer determines the eviction cost of a cache line based on the current counter value or list position.

In a further embodiment, the completer accesses a memory, such as an in-place flash memory, which has limited wear durability. For such a memory, repeated accesses to the same memory location can cause failure of the memory. Thus, for example, a line that has been accessed many times before has a higher eviction cost than a line that has been accessed less often. Keeping a particular line in the cache for a longer time reduces the likelihood that the line will have to be accessed again. This approach promotes wear leveling of the memory. Separate read and write costs may be maintained, since the cost of evicting valid, dirty data may be different to the cost of re-reading the data.

In a still further embodiment, the completer accesses a non-uniform memory. In this embodiment, the cost may be dependent upon the type of memory accessed for a particular line. For example, memories may have different access times, so the performance cost of accessing a line in a slow memory is greater than the cost of accessing a line in a faster memory. Alternatively, the energy used in accessing a line in one memory may be greater than the energy used in accessing a line in another memory.

Figure 1:
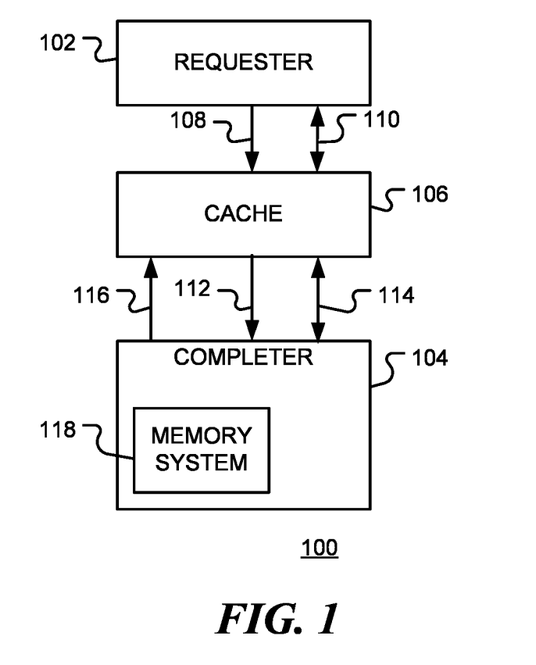
FIG. 1 is a simplified block diagram of a data processing apparatus, in accordance with various representative embodiments.

FIG. 1 is a simplified block diagram of a data processing apparatus 100 in accordance with embodiments of the disclosure. Data processing apparatus 100 includes requester 102, completer 104 and cache 106. Data is transferred between requester device 102 and cache 106 and between completer device 104 and cache 106 in response to requests. Cache 106 may include a cache memory and a cache controller. The cache is configured to implement a cache eviction policy for data stored in the cache.

Requester device 102 requests data from the cache via request channel 108 and data is transferred between the requester device and the cache on data channel 110. Cache 106 requests data from completer device 104 on request channel 112 and data is transferred between the cache and the completer device on data channel 114. The completer device determines a cost of evicting data lines from the cache and notifies the cache, on cost channel 116, of the eviction cost. The cache eviction policy for data in the cache is based, at least in part, on the cost of evicting the data from the cache In one embodiment, the completer device is configured to notify the cache of the cost of evicting the data from the cache in response to a request from the cache.

In a further embodiment, the completer device is configured to notify the cache of the cost of evicting the data from the cache in response to a read request for the data.

Completer device 104 may include memory system 118 that is accessed in response to requests from the cache.

Figure 2:
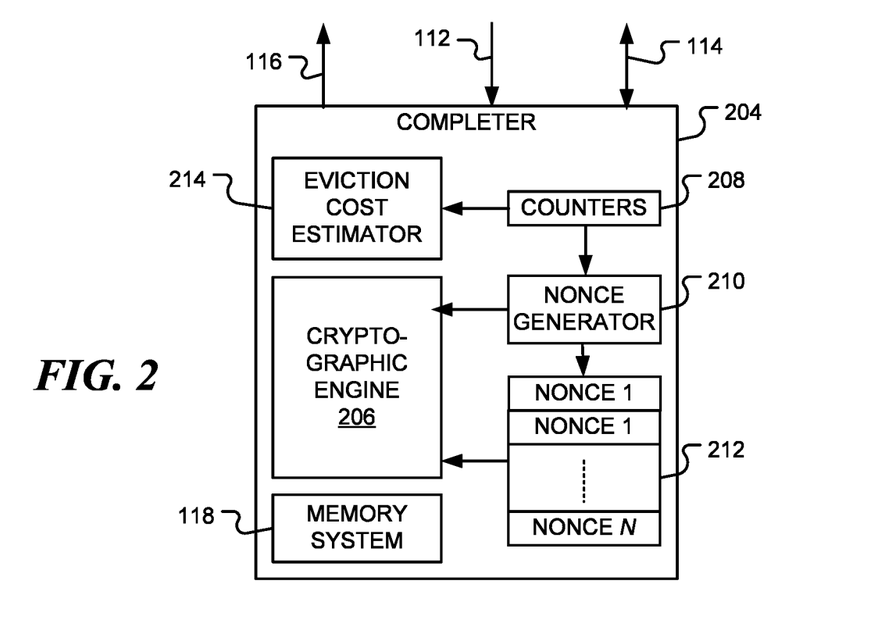
FIG. 2 is a block diagram of a completer device, in accordance with various representative embodiments.

FIG. 2 is a block diagram of a completer device 204 in accordance with an embodiment of the disclosure. Completer device 204 is a memory protection engine (MPE) and includes cryptographic engine 206. The MPE implements a memory protection policy based, at least in part, on a use of nonces (one time use numbers) for confidentiality or data integrity protection. In response to a request from the requester device to access data at a location in the memory system, a corresponding count in counter set 208 is updated. Nonce generator 210 generates a nonce 212, based on a value of the counter, and the nonce is used to ensure integrity and confidentiality of the data in the memory system. Data in the memory system is re-encrypted when counter reaches a designated value. Eviction cost estimator 214 is configured to determine the cost of evicting the data from the cache based, at least in part, on a current value of the associated counter. A higher cost is associated with a counter closer to its designated value.

Figure 3:
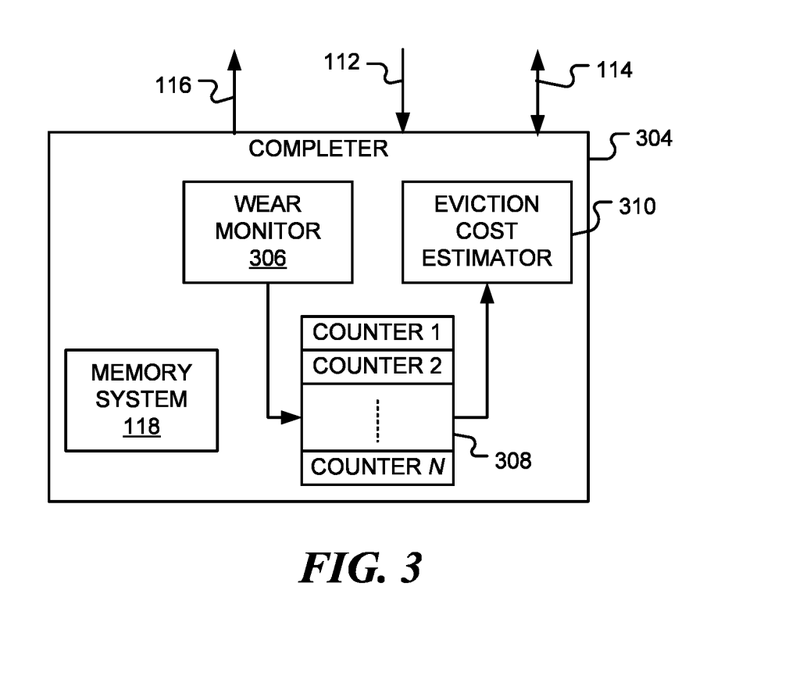
FIG. 3 is a further block diagram of a completer device, in accordance with various representative embodiments.

FIG. 3 is a block diagram of a completer device 304 in accordance with a further embodiment of the disclosure. The completer device includes a wear monitor 306 that monitors accesses (write and/or operations) to memory system 118. When an access occurs to a region of memory, an associated counter 308 is updated. Eviction cost estimator 310 determines, based on a number of accesses to the memory region, the cost of evicting data associated with the memory region from the cache. The cost is higher for a memory region that has been subject to more accesses so as to promote wear leveling. The memory system 118 may include flash memory or other types of volatile or non-volatile memory.

Figure 4:
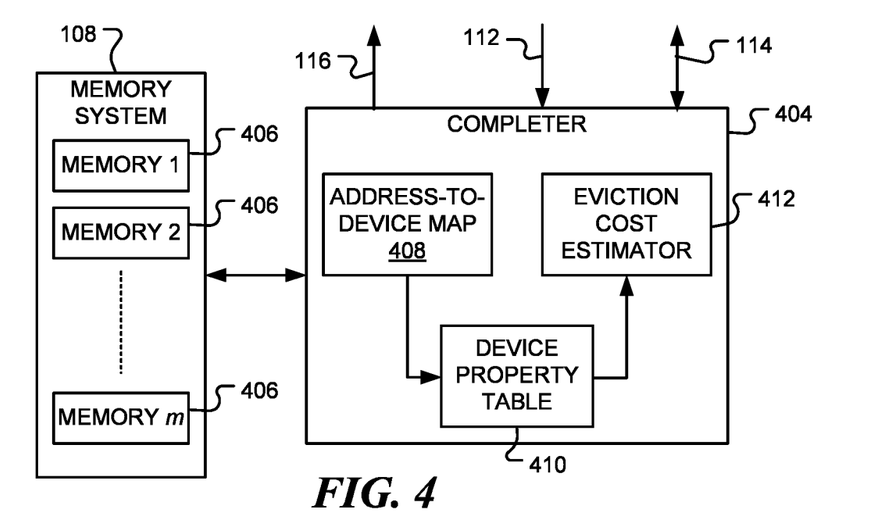
FIG. 4 is a still further block diagram of completer device, in accordance with various representative embodiments.

FIG. 4 is a block diagram of a completer device 404, in accordance with a still further embodiment of the disclosure. Memory system 108 includes a number of memories 406 (MEMORY 1, MEMORY 2, . . . , MEMORY m). The memories may have different properties, such as latency, durability, energy usage, etc. When the completer device receives a request, on request channel 112 for data associated with an address, address-to-device map 408 is used to determine which memory 406 is associated with the address. The appropriate memory is accessed and the data is returned on channel 114 to the cache. Device property table 410 is accessed, based on the requested address, to determine one or more properties of the accessed memory. These properties are used in eviction cost estimator 412 to determine a cost associated with the access. The cost is returned on channel 116. Alternatively, the request received from the cache may just be for a cost associated with an address. In this case, the memory is not accessed and only the cost is returned to the cache. An example device property table is described below. The completer device is configured to determine the cost of evicting the data from the cache based, at least in part, on a property of the memory where the evicted data is to be stored.

In one embodiment, the cost of evicting the data from the cache is based, at least in part, on an access time of the memory where the evicted data is to be stored. A higher eviction cost is given when the memory has a longer access time.

In a further embodiment, the cost of evicting the data from the cache is based, at least in part, on an energy usage of the memory where the evicted data is to be stored. A higher cost is associated with a greater energy usage.

In a still further embodiment, the cost of evicting the data from the cache is based, at least in part, on a durability of the memory where the evicted data is to be stored. The cost is higher for less durable memory.

Figure 5:
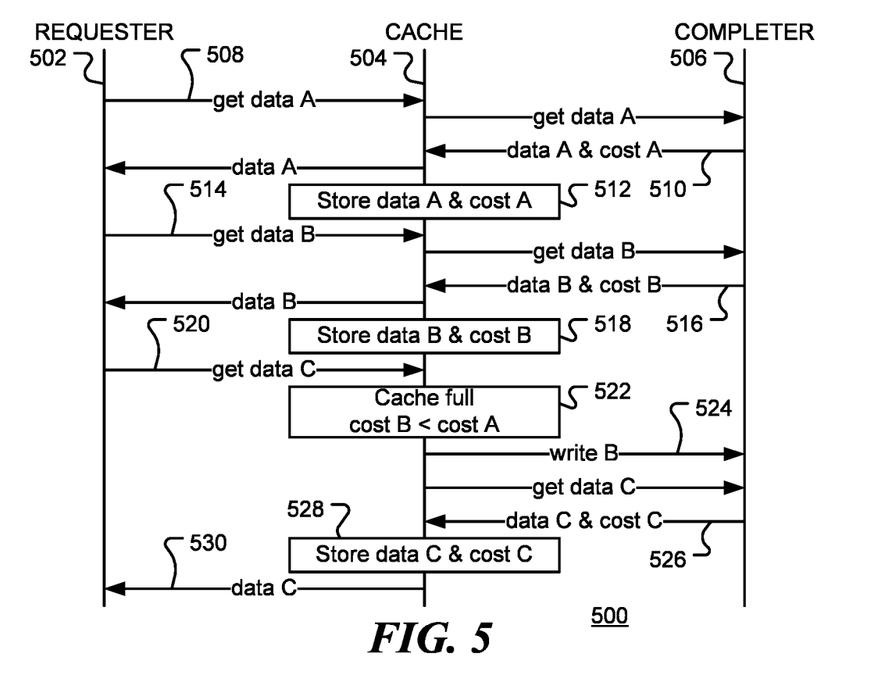
FIG. 5 is a sequence diagram for a method for determining eviction costs for data in a cache of a data processing apparatus, in accordance with various representative embodiments.

FIG. 5 is a sequence diagram 500 for a method for determining eviction costs for data in a cache of a data processing apparatus, in accordance with embodiments of the disclosure. FIG. 5 shows timeline 502 for a requester, timeline 504 for a cache and timeline 506 for a completer, with time flowing downwards. At 508, the Requestor device requests first data (data A) from the cache. If the data is not in the cache, the cache requests the data from the completer. On receipt of the request, the completer determines a cost of evicting the first data from the cache. At 510, the completer transfers the data and notifies the cache of the eviction cost (cost A) of the data. The cache stores the data and the eviction cost at 512.

This process is repeated for second data (data B). Data B is requested at 514. The completer provides the data and its eviction cost to the cache at 516. The cache, in turn, passes the data to the requester and stores data B and its eviction cost (cost B) at 518.

At 520, the requester requests third data (data C) from the cache. If the data is not in the cache, the cache requests the data from the completer. However, assuming the cache is now full, data must be selected for eviction to make space for data C. At 522, the cache compares the eviction costs of data A and data B. When the eviction cost of data B is lower than that of data A, data B is evicted from the cache and written back to the completer at 524. Data C, together with its eviction cost, is passed to the cache at 526. The cost is stored in the cache at 528 and data C is passed to the requester at 530.

In the embodiment shown in FIG. 5, the notification is performed in response to the completer receiving the request for the first data from the requester.

Figure 6:
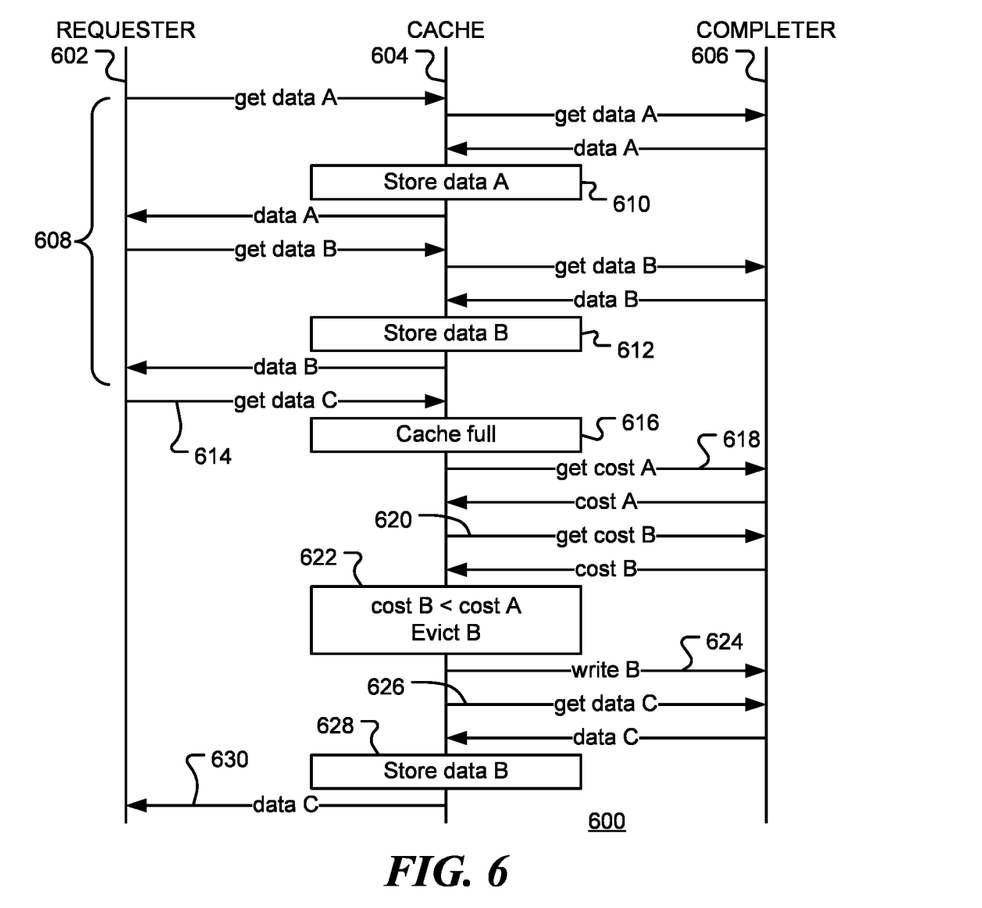
FIG. 6 is a further sequence diagram for a method for determining eviction costs for data in a cache of a data processing apparatus, in accordance with various representative embodiments.

FIG. 6 is a sequence diagram 600 of a method for determining eviction costs for data in a cache of a data processing apparatus, in accordance with embodiments of the disclosure. FIG. 6 shows timeline 602 for a requester, timeline 604 for a cache and timeline 606 for a completer, with time flowing downwards. In time period 608, the requester requests data A and data B from the cache. Neither data are in the cache, so the data is retrieved from the completer and passed to the requester. Since the cache is not full, data A and data B are stored in the cache as indicated by 610 and 612.

At 614, the requester requests data C. However, at 616, the cache determines that the cache is full and so it must select which cache line to evict to make space for data C. At 618, the cache requests the cost of evicting data A, and at 620 the cache requests the cost of evicting data B. The completer notifies the cache of these costs. It is noted that the costs may not be the same as the cost when the data was stored in the cache at 610 and 612. At 622, the cache compares the cost of evicting data B with the cost of evicting data A. The cache determines that the cost of evicting data B is lower, so data B is evicted and written back to the completer at 624. The cache can then request data C at 624. Data C is stored in the cache at 628 and passed to the requester at 630.

In the embodiment shown in FIG. 6, the notification is performed in response to the completer receiving a request for the cost of evicting from the requester.

Figure 7:
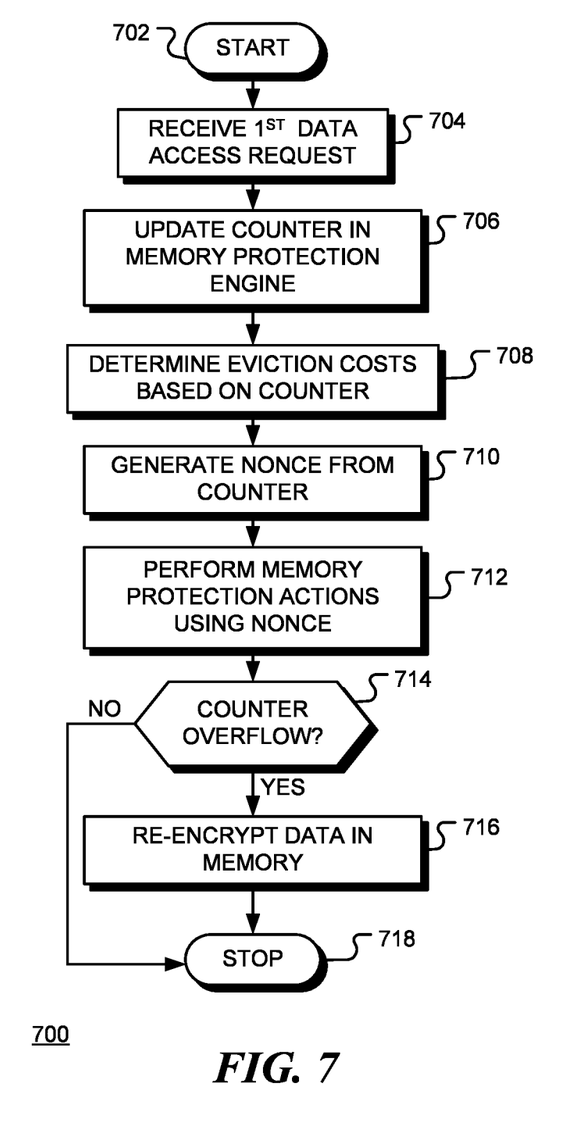
FIG. 7 is a flow chart for a method for determining eviction cost in a memory protection engine, in accordance with various representative embodiments.

FIG. 7 is a flow chart 700 of a method for determining eviction cost in an embodiment in which the completer is a memory protection engine (MPE). Following start block 702, the MPE receives a request for first data, associated with a first address at block 704. A counter of the MPE, associated with the first address, is updated at block 706. The eviction cost of the first data is determined at block 708, based on the counter value, and a nonce is generated at block 710. At block 712, the nonce is used to perform memory protection actions. The requester cooperates in the memory protection actions and the first data is transferred to the cache in accordance the memory protection protocol.

In the event of a counter overflow, or the counter reaching a designated value, as depicted by the positive branch from decision block 714, the data stored in the memory is re-encrypted at block 716. The method terminates at block 718. Re-encrypting the data is an intensive operation. Consequently, the cost of evicting the first data from the cache is based, at least in part, on a current value of the counter, a higher cost associated with a counter closer to its designated value.

Figure 8:
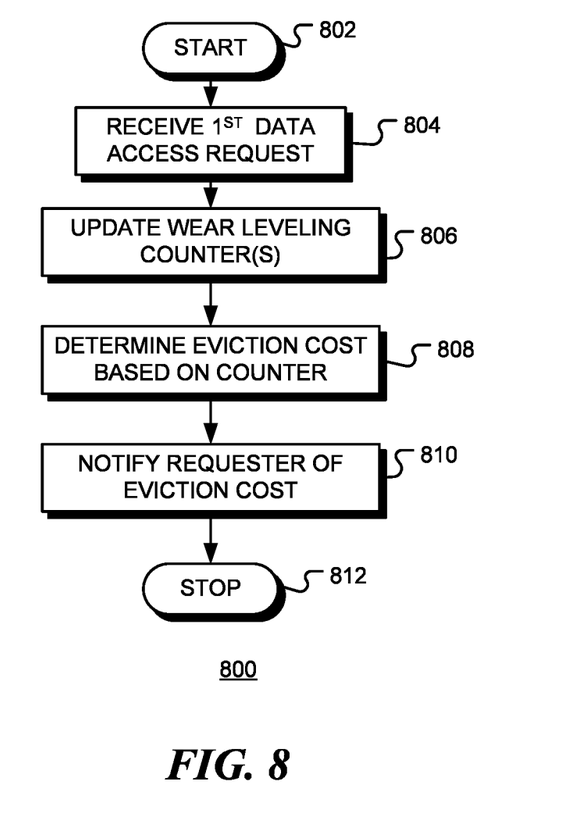
FIG. 8 is a flow chart of a method for determining eviction cost in completer device that includes a wear-leveling system, in accordance with various representative embodiments.

FIG. 8 is a flow chart 800 of a method for determining eviction cost in an embodiment in which the memory system includes a wear leveling system. Following start block 802, the completer receives, at block 804, a request from the cache for first data associated with a first address. A wear leveling counter, associated with the first address, is updated at block 806. The counter may track accesses to a memory region containing the first address, for example. The eviction cost of the first data is determined at block 808, based on the counter value. The cache is notified of the cost at block 810. The cache selects data to be evicted from the cache based on the eviction costs of data in the cache. The method terminates at block 812. In this embodiment, the eviction cost is based, at least in part, on a number of accesses to the memory region, the cost of evicting data associated with the memory region from the cache. The cost is higher for a memory region that has been subject to more accesses so as to promote wear leveling. The memory region may be a region of flash memory, for example.

Figure 9:
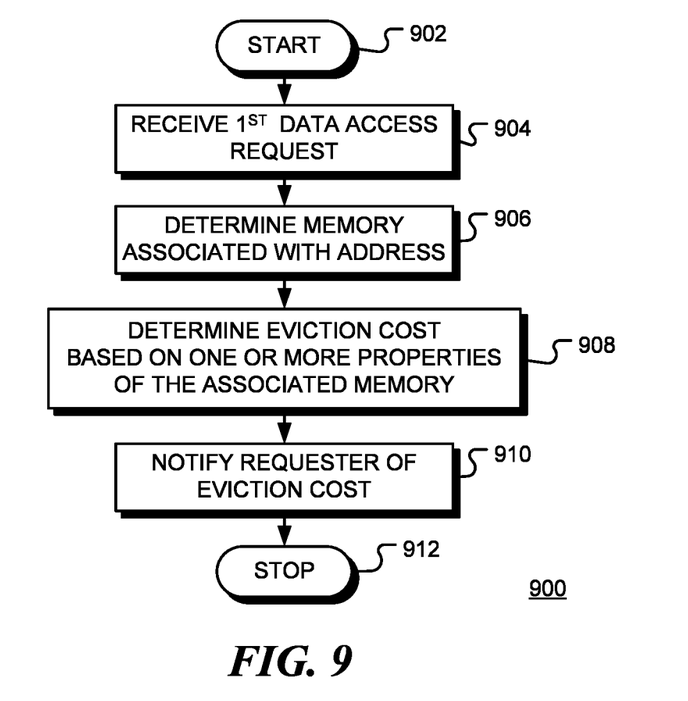
FIG. 9 is a flow chart of a method for determining eviction cost in a completer device that includes multiple memories having different properties, in accordance with various representative embodiments.

FIG. 9 is a flow chart 900 of a method for determining eviction cost in an embodiment in which the memory system includes multiple memories having different properties. In this embodiment, the cost of evicting the data from the cache is determined based, at least in part, on a property of the memory where the evicted data would be stored. Following start block 902, the completer receives, at block 904, a request for first data associated with a first memory address, from a cache. At block 906, the completer determines which memory contains the first address and, at block 908, the completer determines the eviction cost associated with the determined memory. At block 910, the completer notifies the requester of the eviction cost. The cache selects a cache line to be evicted based, at least in part, on the eviction costs of the data in the cache. The method terminates at block 912.

Figure 10:
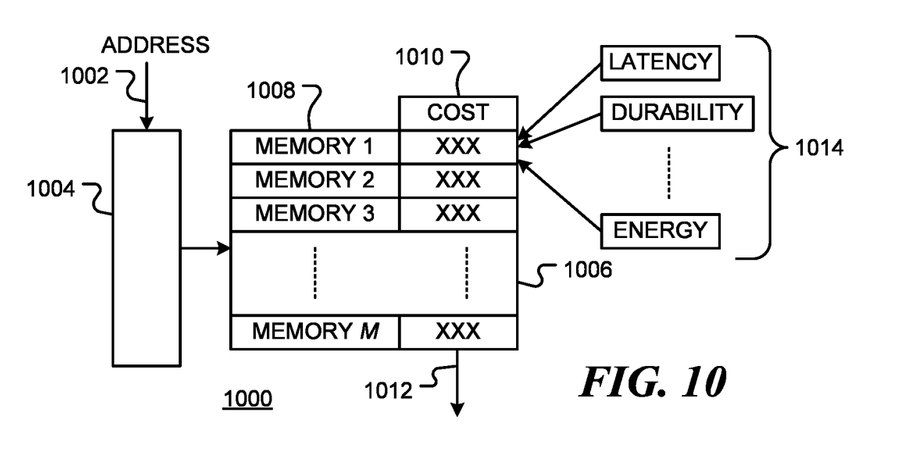
FIG. 10 is a diagrammatic representation of an eviction cost estimator, in accordance with various representative embodiments.

FIG. 10 is a diagrammatic representation of an eviction cost estimator 1000 in accordance with embodiments of the disclosure. Estimator 1000 receives, as input, an address 1002. The address is used in mapping table 1004 to identify which memory includes the address. Cost table 1006 is indexed by memory identifiers 1008 and stores costs 1010 associated with each memory. The identified memory is used in cost table 1006 to determine the cost 1012 associated with the memory that includes the address. The cost may be function of one or more memory properties 1014, such as latency, durability and energy usage.

The cache may select the victim cache line based, at least in part, on the cost provided by the completer. In one embodiment, in a set associative cache, the cache first looks for a non-dirty line in the set. If all of the caches in the set are dirty, the line with the lowest eviction cost is evicted. Existing cache eviction policies may be augmented using the eviction costs provided by the completer.

In one embodiment, a modified least-recently-used (LRU) policy is employed in which a counter associated with a cache line is set to the eviction cost value (or a number derived therefrom) when the line is loaded into the cache. The counter for a line is decremented when a new line is loaded to the cache and the counter is reset to the cost value when the line is reused by the processor. In this way, an unused line will remain in the cache longer if it has a higher eviction cost.

In a further embodiment, a candidate line for eviction is selected at random based on a first random number. The line is evicted from the cache only if a second random number is greater than a threshold, where the threshold is higher for lines with a higher eviction cost. If the second random number is below the threshold, another cache line is selected at random. This process may be repeated a designated number of times. In this way, a cache line is less likely to be evicted if it has a higher eviction cost.

Other eviction policies will be apparent to those of ordinary skill in the art.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described, for example, by instructions of a hardware description language (HDL), such as VHDL, Verilog or RTL (Register Transfer Language), or by a netlist of components and connectivity. The instructions may be at a functional level or a logical level or a combination thereof. The instructions or netlist may be input to an automated design or fabrication process (sometimes referred to as high-level synthesis) that interprets the instructions and creates digital hardware that implements the described functionality or logic.

The HDL instructions or the netlist may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A data processing apparatus, comprising:
   a cache configured to implement a cache eviction policy for data stored in the cache;
   a first device configured to request data from the cache over a first request channel and transfer data from the cache over a first data channel; and
   a second device, including a memory storing encrypted data, configured to:
      implement a memory protection policy, update a counter in response to receiving the request from the cache, the counter associated with a memory region in the memory, re-encrypt data stored in the memory when the counter reaches a designated value, transfer data to the cache over a second data channel in response to a request received from the cache over a second request channel, determine an eviction cost for evicting the transferred data from the cache, the eviction cost based, at least in part, on a current value of the counter, where a higher eviction cost indicates that the counter is closer to the designated value, and send the eviction cost to the cache, where the transferred data is associated with the memory region in the memory, and where the cache eviction policy for the transferred data is based, at least in part, on the eviction cost.

2. The data processing apparatus of claim 1, where the second device is configured to send the eviction cost to the cache in response to a request from the cache.

3. The data processing apparatus of claim 1, where the second device is configured to send the eviction cost to the cache in response to a read request for the data.

4. The data processing apparatus of claim 1, where the second device is a memory protection engine configured to:

implement the memory protection policy based, at least in part, on a use of nonces for confidentiality or data integrity protection; and generate a nonce based on a value of the counter in response to receiving the request from the cache.

5. The data processing apparatus of claim 1, where the second device is further configured to:

count accesses to the memory region; and determine the eviction cost based on a number of accesses to the memory region, where the eviction cost is higher when the memory region has been subjected to more accesses.

6. The data processing apparatus of claim 5, where the memory region is a region of flash memory.

7. The data processing apparatus of claim 1, where:

the memory is a memory system that includes a plurality of memories having different properties, and the second device is further configured to determine the eviction cost based, at least in part, on a property of the memory in which the evicted data is to be stored.

8. The data processing apparatus of claim 7, where the eviction cost is based, at least in part, on an access time of the memory in which the evicted data is to be stored and where the eviction cost is higher for a memory with a longer access time.

9. The data processing apparatus of claim 7, where the eviction cost is based, at least in part, on an energy usage of the memory in which the evicted data is to be stored and where the eviction cost is higher for a memory with greater energy usage.

10. The data processing apparatus of claim 7, where the eviction cost is based, at least in part, on a durability of the memory in which the evicted data is to be stored and where the eviction cost is higher for a less durable memory.

11. A method comprising:

requesting, by a first device over a first request channel, data from a cache;

requesting, by the cache over a second request channel, the data from a second device including a memory storing encrypted data, the requested data being associated with a memory region in the memory, and wherein the second device is configured to implement a memory protection policy;

updating a counter in response to receiving the request from the cache, the counter associated with the memory region;

re-encrypt data stored in the memory when the counter reaches a designated value;

transferring, by the second device over a second data channel, the requested data to the cache in response to the request from the cache;

sending, by the cache over a first data channel, the transferred data to the first device;

determining, by the second device, an eviction cost for evicting the transferred data from the cache, the eviction cost based, at least in part, on a current value of the counter, where a higher eviction cost indicates that the counter is closer to the designated value;

sending, by the second device, the eviction cost to the cache;

determining, by the cache, whether to evict the transferred data from the cache based, at least in part, on the eviction cost; and when the transferred data is determined to be evicted, evicting, by the cache, the transferred data from the cache.

12. The method of claim 11, where said determining the eviction cost is performed in response to the second device receiving a request for the eviction cost from the cache over the second request channel.

13. The method of claim 11, where said determining the eviction cost is performed in response to the second device receiving the request for the data from the cache.

14. The method of claim 11, where the second device is a memory protection engine, and the method further comprises:

generating a nonce based on a value of the counter in response to receiving the request from the cache; and transferring the data from the second device to the cache in accordance with the memory protection policy using the generated nonce.

15. The method of claim 11, further comprising:

counting accesses to the memory region; and determining, based at least in part on a number of accesses to the memory region, the eviction cost, where the eviction cost is higher when the memory region has been subjected to more accesses.

16. The method of claim 15, where the memory region is a region of flash memory.

17. The method of claim 11, where:

the memory comprises a plurality of memories having different properties, and said determining the eviction cost is based, at least in part, on a property of the memory in which the evicted data is to be stored.

18. The method of claim 17, where the eviction cost is based, at least in part, on an access time of the memory in which the second data is to be stored and where the eviction cost is higher for a memory with a longer access time.

19. The method of claim 17, where the eviction cost is based, at least in part, on an energy usage of the memory in which the data is to be stored and where the eviction cost is higher for a memory with a greater energy usage.

20. The method of claim 17, where the eviction cost is based, at least in part, on a durability of the memory in which the evicted data is to be stored and where the eviction cost is higher for less durable memory.

* * * * *